United States Patent
Takayama

(10) Patent No.: US 10,401,038 B2
(45) Date of Patent: Sep. 3, 2019

(54) HEAT PUMP SYSTEM

(71) Applicant: Mitsubishi Electric Corporation, Tokyo (JP)

(72) Inventor: Keisuke Takayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 181 days.

(21) Appl. No.: 15/546,466

(22) PCT Filed: Mar. 19, 2015

(86) PCT No.: PCT/JP2015/058291
§ 371 (c)(1),
(2) Date: Jul. 26, 2017

(87) PCT Pub. No.: WO2016/147389
PCT Pub. Date: Sep. 22, 2016

(65) Prior Publication Data
US 2018/0023818 A1  Jan. 25, 2018

(51) Int. Cl.
*F24D 3/18* (2006.01)
*F24H 1/00* (2006.01)
(Continued)

(52) U.S. Cl.
CPC ............ *F24D 3/18* (2013.01); *F24D 11/0214* (2013.01); *F24D 19/1024* (2013.01);
(Continued)

(58) Field of Classification Search
CPC .... F24D 3/18; F24D 19/1039; F24D 19/1024; F24D 11/0214; F25B 2309/061;
(Continued)

(56) References Cited

U.S. PATENT DOCUMENTS

2011/0036110 A1  2/2011  Fujimoto
2013/0098096 A1  4/2013  Nakayama
2013/0098102 A1  4/2013  Nakayama

FOREIGN PATENT DOCUMENTS

CN  102985767 A  3/2013
JP  2006-132427 A  5/2006
(Continued)

OTHER PUBLICATIONS

English translation of the international preliminary report on patentability for International application No. PCT/JP2015/058291 dated Sep. 28, 2017.
(Continued)

*Primary Examiner* — Ana M Vazquez
(74) *Attorney, Agent, or Firm* — Posz Law Group, PLC

(57) ABSTRACT

A heat pump system includes: a compressor for compressing refrigerant; a first heat exchanger for exchanging heat between the refrigerant compressed by the compressor and a heating medium; a second heat exchanger for exchanging heat between the refrigerant compressed by the compressor and the heating medium; a first pipe through which the refrigerant is fed from the compressor to the first heat exchanger; a second pipe through which the refrigerant returns from the first heat exchanger to the compressor; a third pipe through which the refrigerant is fed from the compressor to the second heat exchanger after returning from the first heat exchanger; and switching apparatus for switching a flow of the heating medium between a first mode and a second mode. The heating medium flows through the first heat exchanger and the second heat exchanger in series in the first mode. The heating medium flows through the first heat exchanger and the second heat exchanger in parallel in the second mode.

17 Claims, 7 Drawing Sheets

(51) Int. Cl.
  *F25B 1/10* (2006.01)
  *F25B 6/04* (2006.01)
  *F24D 19/10* (2006.01)
  *F25B 30/02* (2006.01)
  *F24D 11/02* (2006.01)
  *F25B 9/00* (2006.01)
  *F25B 40/00* (2006.01)

(52) U.S. Cl.
  CPC ........... *F24D 19/1039* (2013.01); *F24H 1/00* (2013.01); *F25B 1/10* (2013.01); *F25B 6/04* (2013.01); *F25B 9/008* (2013.01); *F25B 30/02* (2013.01); *F25B 40/00* (2013.01); *F25B 2309/061* (2013.01); *Y02B 30/12* (2013.01)

(58) Field of Classification Search
  CPC ... F25B 6/04; F25B 30/02; F25B 1/10; Y02B 30/12; F24H 1/00
  See application file for complete search history.

(56) References Cited

FOREIGN PATENT DOCUMENTS

| JP | 2008-002776 A | 1/2008 |
| JP | 2009-270747 A | 11/2009 |
| JP | 2012-021721 A | 2/2012 |
| WO | 2012/008431 A1 | 1/2012 |

OTHER PUBLICATIONS

International Search Report of the International Searching Authority dated May 19, 2015 for the corresponding International application No. PCT/JP2015/058291 (and English translation).

Extended EP Search Report dated Nov. 28, 2018 issued in corresponding EP patent application No. 15885485.1.

Chinese Office Action dated May 28, 2019 for corresponding CN application No. 201580077856.1 (English translation attached).

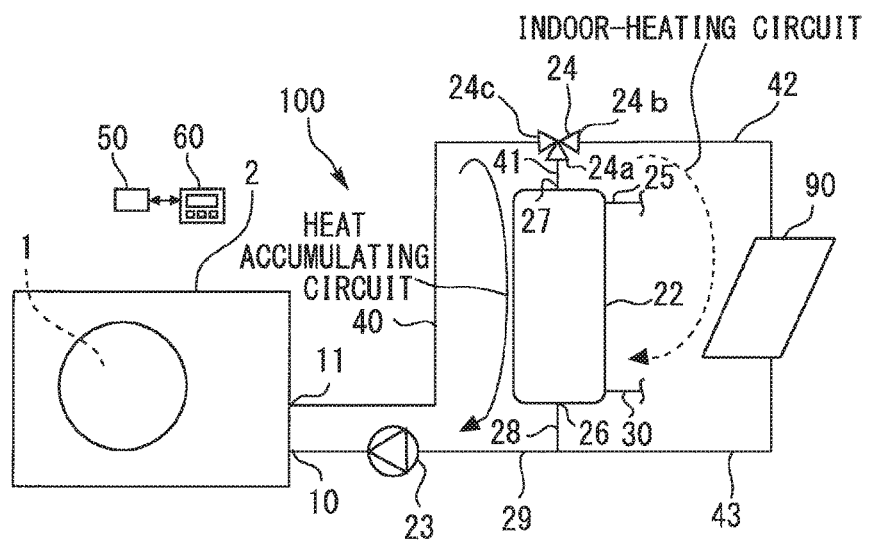

HEAT PUMP SYSTEM

CROSS REFERENCE TO RELATED APPLICATION

This application is a U.S. national stage application of International Application No. PCT/JP2015/058291 filed on Mar. 19, 2015, the disclosure of which is incorporated herein by reference.

TECHNICAL FIELD

The present invention relates to a heat pump system.

BACKGROUND ART

PTL 1 described below discloses a hot water supply cycle apparatus constituted by a gas cooler including high temperature-side refrigerant piping, low temperature-side refrigerant piping, and water piping, and a hot water supply compressor including a sealed container, a compressing unit, an electric motor, a suction pipe, a discharge pipe, a refrigerant re-introduction pipe, and a refrigerant re-discharge pipe. In this apparatus, the suction pipe directly guides a low pressure refrigerant to the compressing unit, a high pressure refrigerant compressed by the compressing unit is directly discharged to outside of the sealed container from the discharge pipe without being discharged into the sealed container, a refrigerant after the high pressure refrigerant passes through the high temperature-side refrigerant piping and undergoes heat exchange is guided into the sealed container by the refrigerant re-introduction pipe, and a refrigerant after passing through the electric motor inside the sealed container is re-discharged to the outside of the sealed container from the refrigerant re-discharge pipe and fed to the low temperature-side refrigerant piping.

PTL 2 described below discloses an apparatus constituted by a first compressing unit, a first heat exchanger, a second compressing unit, and a second heat exchanger and which branches water fed from an inflow water pipe and causes heat exchange to be performed by feeding the water to the first heat exchanger and the second heat exchanger in parallel.

CITATION LIST

Patent Literature

[PTL 1] Japanese Patent Application Laid-open No. 2006-132427
[PTL 2] Japanese Patent Application Laid-open No. 2009-270747

SUMMARY OF INVENTION

Technical Problem

With the apparatus according to PTL 1, in the gas cooler, the refrigerant flows in series through the high temperature-side refrigerant piping and the low temperature-side refrigerant piping and water performs heat exchange in series in an order of the low temperature-side refrigerant piping and the high temperature-side refrigerant piping. In a hot water accumulating operation, for example, a water inflow temperature is 9° C. and a hot water outflow temperature is 65° C. under winter conditions. In this manner, there is a large temperature difference between an outlet and an inlet of water of the gas cooler and a water flow rate is low. In this case, a heat exchanger with a small flow path cross-sectional area must be used in order to improve a heat-transfer coefficient of water. Supposing that an indoor-heating operation is performed using the same apparatus, the temperature difference between the outlet and the inlet of water of the gas cooler is reduced to, for example, around 5° C. to 10° C. Maintaining same heating power as a hot water accumulating operation results in a significantly high water flow rate. Thus, using a gas cooler designed for a hot water accumulating operation to perform an indoor-heating operation increases flow velocity of water and results in greater water pressure loss. In addition, there is a possibility that erosion may occur at heat-transfer pipes.

In the apparatus according to PTL 2, since water is fed to the first heat exchanger and the second heat exchanger in parallel to perform heat exchange, a water flow rate is readily increased. However, since the water is fed in parallel, it is difficult to raise the hot water outflow temperature. In addition, a compression process takes place in two stages in the first compressing unit and the second compressing unit and the refrigerant is intercooled by the first heat exchanger. Therefore, the temperature of the refrigerant flowing into the first heat exchanger and the second heat exchanger is lower as compared to the apparatus according to PTL 1.

The present invention has been made in order to solve problems such as that described above and an object thereof is to provide a heat pump system capable of favorably accommodating both an operation when a flow rate of a heating medium is high and an operation when the flow rate of the heating medium is low.

Solution to Problem

A heat pump system of the invention includes: a compressor configured to compress refrigerant; a first heat exchanger configured to exchange heat between the refrigerant compressed by the compressor and a heating medium; a second heat exchanger configured to exchange heat between the refrigerant compressed by the compressor and the heating medium; a first pipe through which the refrigerant is fed from the compressor to the first heat exchanger; a second pipe through which the refrigerant returns from the first heat exchanger to the compressor; a third pipe through which the refrigerant is fed from the compressor to the second heat exchanger after returning from the first heat exchanger; and a switching apparatus configured to switch a flow of the heating medium between a first mode and a second mode. The heating medium flows through the first heat exchanger and the second heat exchanger in series in the first mode. The heating medium flows through the first heat exchanger and the second heat exchanger in parallel in the second mode.

Advantageous Effects of Invention

With a heat pump system according to the present invention, by including switching apparatus configured to switch a flow of a heating medium between a first mode and a second mode, causing the heating medium to flow through a first heat exchanger and a second heat exchanger in series in the first mode, and causing the heating medium to flow through the first heat exchanger and the second heat exchanger in parallel in the second mode, a heat pump system can be provided which is capable of favorably accommodating both an operation when a flow rate of the heating medium is high and an operation when the flow rate of the heating medium is low.

FIG. 2 is a configuration diagram showing a hot water supply and indoor-heating system according to the first embodiment of the present invention.

FIG. 3 is a diagram showing a state of a first mode of the heat pump system according to the first embodiment of the present invention.

DESCRIPTION OF EMBODIMENTS

Figure 1:
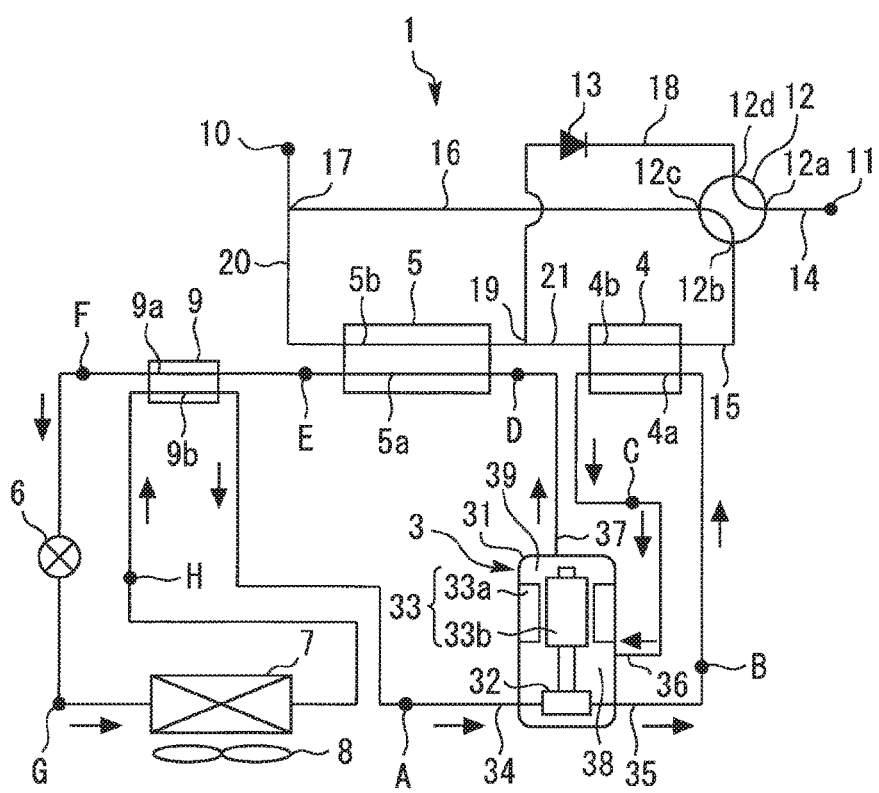
FIG. 1 is a configuration diagram showing a heat pump system according to a first embodiment of the present invention.

Hereinafter, embodiments of the present invention will be described with reference to the drawings. Note that common elements in the drawings are denoted by same reference signs and overlapping descriptions will be omitted. In the present specification, "water" is a concept encompassing liquid water in all temperature ranges from low-temperature cold water to high-temperature hot water.

First Embodiment

FIG. 1 is a configuration diagram showing a heat pump system according to a first embodiment of the present invention. As shown in FIG. 1, a heat pump system 1 according to the present first embodiment is provided with a refrigerant circuit including a compressor 3, a first heat exchanger 4, a second heat exchanger 5, an expansion valve 6, and an evaporator 7. The first heat exchanger 4 and the second heat exchanger 5 are heat exchangers which heat a heating medium using heat of a refrigerant. The first heat exchanger 4 includes a refrigerant passage 4a and a heating medium passage 4b. Heat exchange takes place between a refrigerant flowing through the refrigerant passage 4a and a heating medium flowing through the heating medium passage 4b. The second heat exchanger 5 includes a refrigerant passage 5a and a heating medium passage 5b. Heat exchange takes place between a refrigerant flowing through the refrigerant passage 5a and a heating medium flowing through the heating medium passage 5b. While a case where the heating medium is water will be described in the present first embodiment, the heating medium according to the present invention may be a fluid other than water such as brine and antifreeze.

The expansion valve 6 is a decompressor which decompresses the refrigerant. The evaporator 7 is a heat exchanger which causes the refrigerant to evaporate. In the present first embodiment, the evaporator 7 is an air-refrigerant heat exchanger which performs heat exchange between air and the refrigerant. The heat pump system 1 further includes an air blower 8 which blows air toward the evaporator 7 and a high/low pressure heat exchanger 9 which performs heat exchange between a high pressure refrigerant and a low pressure refrigerant. In the present first embodiment, carbon dioxide is used as the refrigerant. The evaporator 7 according to the present invention is not limited to an evaporator which performs heat exchange between air and the refrigerant and may be, for example, an evaporator which performs heat exchange between groundwater, solar-heated hot water, or the like and the refrigerant. The high/low pressure heat exchanger 9 includes a high pressure passage 9a and a low pressure passage 9b. Heat exchange takes place between the high pressure refrigerant flowing through the high pressure passage 9a and the low pressure refrigerant flowing through the low pressure passage 9b.

The compressor 3 includes a sealed container 31, a compressing unit 32, and an electric motor 33. The compressing unit 32 and the electric motor 33 are arranged inside the sealed container 31. The compressing unit 32 is arranged on a lower side of the electric motor 33. The inside of the sealed container 31 has an internal space 38 between the compressing unit 32 and the electric motor 33 and an internal space 39 on an upper side of the electric motor 31. A low pressure refrigerant is compressed by the compressing unit 32 to become a high pressure refrigerant. The compressing unit 32 is driven by the electric motor 33. The electric motor 33 includes a stator 33a and a rotor 33b. A first pipe 35, a second pipe 36, a third pipe 37, and a fourth pipe 34 are connected to the compressor 3. The high pressure refrigerant compressed by the compressing unit 32 is discharged to the first pipe 35. This high pressure refrigerant passes through the first pipe 35 to be fed to the refrigerant passage 4a of the first heat exchanger 4 without being discharged to the internal spaces 38 and 39 of the sealed container 31. The high pressure refrigerant is cooled by water when passing through the refrigerant passage 4a of the first heat exchanger 4. The high pressure refrigerant having passed through the first heat exchanger 4 passes through the second pipe 36 and returns to the compressor 3 from the first heat exchanger 4.

An outlet of the second pipe 36 is positioned in the internal space 38 between the electric motor 33 and the compressing unit 32. The high pressure refrigerant having passed through the second pipe 36 and reintroduced into the compressor 3 is discharged into the internal space 38 between the electric motor 33 and the compressing unit 32 without being compressed. An inlet of the third pipe 37 is positioned in the internal space 39 on the upper side of the electric motor 33. The high pressure refrigerant in the internal space 38 passes through a gap between the rotor 33b and the stator 33a of the electric motor 33 and the like and reaches the internal space 39 on the upper side of the electric motor 33. At this point, the electric motor 33 at a high temperature is cooled by the high pressure refrigerant while the high pressure refrigerant is heated by the heat of the electric motor 33. The high pressure refrigerant in the internal space 39 on the upper side of the electric motor 33 passes through the third pipe 37 to be fed to the refrigerant passage 5a of the second heat exchanger 5 without being compressed.

The high pressure refrigerant is cooled by water when passing through the refrigerant passage 5a of the second heat exchanger 5. The high pressure refrigerant having passed through the second heat exchanger 5 flows into the high pressure passage 9a of the high/low pressure heat exchanger 9. The high pressure refrigerant having passed through the high pressure passage 9a reaches the expansion valve 6. The high pressure refrigerant is decompressed when expanding at the expansion valve 6 and becomes a low pressure refrigerant, This low pressure refrigerant flows into the evaporator 7. In the evaporator 7, the low pressure refrigerant is heated by heat exchange with outside air blown by the air blower 8 and evaporates. The low pressure refrigerant having passed through the evaporator 7 flows into the low pressure passage 9b of the high/low pressure heat exchanger 9. The low pressure refrigerant having passed through the low pressure passage 9b passes through the fourth pipe 34 and is sucked into the compressor 3. The low pressure refrigerant having passed through the fourth pipe 34 is guided to the compressing unit 32 without being discharged to the internal spaces 38 and 39 in the sealed container 31. Moreover, due to heat exchange by the high/low pressure heat exchanger 9, the high pressure refrigerant in the high pressure passage 9a is cooled and the low pressure refrigerant in the low pressure passage 9b is heated.

In the following description, pressure of a refrigerant discharged from the compressing unit 32 will be referred to as "compressing unit discharge pressure", pressure of a refrigerant sucked into the compressing unit 32 will be referred to as "compressing unit suction pressure", a temperature of the refrigerant discharged from the compressing unit 32 will be referred to as a "compressing unit discharge temperature", and a temperature of the refrigerant sucked into the compressing unit 32 will be referred to as a "compressing unit suction temperature". Pressure of the high pressure refrigerant in the first pipe 35 is equal to the compressing unit discharge pressure. Pressure of the high pressure refrigerant having passed through the first pipe 35 declines due to pressure loss which occurs before the high pressure refrigerant reaches the second pipe 36 via the first heat exchanger 4. Therefore, pressure of the high pressure refrigerant in the internal space 38 of the seated container 31 is slightly lower than the pressure of the high pressure refrigerant inside the first pipe 35 or, in other words, the compressing unit discharge pressure.

The heat pump system 1 includes a switching apparatus which switches a flow of a heating medium between a first mode and a second mode. In the first mode, the heating medium flows through the first heat exchanger 4 and the second heat exchanger 5 in series. In the second mode, the heating medium flows through the first heat exchanger 4 and the second heat exchanger 5 in parallel.

The heat pump system 1 includes a heating medium inlet 10, a heating medium outlet 11, a four-way valve 12, and a check valve 13. The four-way valve 12 is a flow path switching valve (a direction switching valve) including a first port 12a, a second port 12b, a third port 12c, and a fourth port 12d. The four-way valve 12 is capable of switching between a first state in which the first port 12a and the second port 12b are communicated with each other and the third port 12c and the fourth port 12d are communicated with each other and a second state in which the first port 12a and the fourth port 12d are communicated with each other and the second port 12b and the third port 12c are communicated with each other.

A first passage 14 connects the first port 12a with the heating medium outlet 11. A second passage 15 connects the second port 12b with the heating medium passage 4b of the first heat exchanger 4. A third passage 16 connects a branching section 17 which branches water prior to being heated in the second mode with the third port 12c. A fourth passage 18 connects a merging section 19 where water heated by the first heat exchanger 4 and the heating medium heated by the second heat exchanger 5 merge in the second mode with the fourth port 12d. The check valve 13 prevents backflow in the fourth passage 18. A fifth passage 20 connects the heating medium inlet 10 with the heating medium passage 5b of the second heat exchanger 5. The branching section 17 is positioned midway along the fifth passage 20. A sixth passage 21 connects the heating medium passage 4b of the first heat exchanger 4 with the heating medium passage 5b of the second heat exchanger 5. The heating medium passage 4b is positioned between the second passage 15 and the sixth passage 21. The merging section 19 is positioned midway along the sixth passage 21. The heating medium passage 5b is positioned between the fifth passage 20 and the sixth passage 21. The check valve 13 allows a flow in a direction from the merging section 19 toward the fourth port 12d but prevents a flow in a direction opposite thereto. In the present first embodiment, the four-way valve 12, the check valve 13, the first passage 14, the second passage 15, the third passage 16, the branching section 17, the fourth passage 18, the merging section 19, the fifth passage 20, and the sixth passage 21 correspond to the switching apparatus which switches a flow of a heating medium between a first mode and a second mode.

FIG. 2 is a configuration diagram showing a hot water supply and indoor-heating system according to the first embodiment of the present invention. As shown in FIG. 2, a hot water supply and indoor-heating system 100 according to the present first embodiment includes a heat pump unit 2, a heat storage tank 22, a circulation pump 23, a controller 50, terminal equipment 60, and an indoor heater 90. The heat pump unit 2 incorporates the heat pump system 1 shown in FIG. 1. Water is stored in the heat storage tank 22. In the heat storage tank 22, temperature stratification with a high-temperature upper side and a low-temperature lower side can be formed due to a difference in density of water caused by a difference in temperatures. A water supply pipe 30 is connected to a lower part of the heat storage tank 22. Water fed from a water source such as waterworks passes through the water supply pipe 30 and is fed to the heat storage tank 22. A hot water supply pipe 25 is connected to an upper part of the heat storage tank 22. The hot water supply and indoor-heating system 100 is capable of performing a heat accumulating operation in which heat generated by the heat pump system 1 of the heat pump unit 2 is accumulated in the heat storage tank 22. In the present first embodiment, hot water heated by the heat pump system 1 is stored in the heat storage tank 22. In the present invention, instead of the configuration described above, a heat exchanger (not shown) which performs heat exchange between a heating medium heated by the heat pump system 1 and water may be provided and hot water heated by the heat exchanger may be stored in the heat storage tank 22. When supplying hot water to the outside, the hot water stored in the heat storage tank 22 is fed out to the hot water supply pipe 25.

The heat storage tank 22 includes a first water outlet 26 and a first water inlet 27. Water inside the heat storage tank 22 exits from the first water outlet 26. Hot water heated by the heat pump system 1 of the heat pump unit 2 enters the heat storage tank 22 from the first water inlet 27. The first water outlet 26 is positioned in a lower part of the heat storage tank 22. The first water inlet 27 is positioned in an upper part of the heat storage tank 22. A three-way valve 24 is a flow path switching valve (a direction switching valve) including a first port 24a, a second port 24b, and a third port 24c. The three-way valve 24 is capable of switching between a state in which the third port 24c is communicated with the first port 24a while blocking the second port 24b and a state in which the third port 24c is communicated with the second port 24b while blocking the first port 24a.

A lower pipe 28 connects the first water outlet 26 of the heat storage tank 22 with an upstream end of a first common pipe 29. A downstream end of the first common pipe 29 is connected to the heating medium inlet 10 of the heat pump system 1 of the heat pump unit 2. The circulation pump 23 is connected to the middle of the first common pipe 29. Output of the circulation pump 23 is desirably variable. As the circulation pump 23, for example, a circulation pump provided with a pulse width modulation control (PWM control) type DC motor capable of varying output in accordance with speed command voltage from the controller 50 can be favorably used. A second common pipe 40 connects the heating medium outlet 11 of the heat pump system 1 of the heat pump unit 2 with the third port 24c of the three-way valve 24. An upper pipe 41 connects the first port 24a of the three-way valve 24 with the first water inlet 27 of the heat storage tank 22. In the present first embodiment, while the circulation pump 23 is connected to the middle of the first common pipe 29, in the present invention, the circulation pump 23 may be connected to the middle of the second common pipe 40. Alternatively, the circulation pump 23 may be built into the heat pump unit 2. In addition, in the present invention, the circulation pump 23 which circulates a heating medium such as water may be provided in plurality and a circulation flow rate of the heating medium may be varied by changing the number of circulation pumps 23 being driven.

The hot water supply and indoor-heating system 100 is capable of performing an indoor-heating operation which raises indoor air temperature by feeding the hot water heated by the heat pump system 1 of the heat pump unit 2 to the indoor heater 90. As the indoor heater 90, for example, at least one of a floor heating panel installed under the floor, a radiator or a panel heater installed inside an interior wall, and a fan convector can be used. A fan convector includes an air blower which circulates indoor air and a heat exchanger which exchanges heat between a heated liquid such as water and indoor air and performs heating by forced convection. The indoor heater 90 may be provided in plurality. A method of connection used when providing a plurality of the indoor heaters 90 may be any of series, parallel, and a combination of series and parallel. When providing a plurality of the indoor heaters 90, types of the indoor heaters 90 may be the same or may differ from one another.

The heat storage tank 22 and the indoor heater 90 are connected via a feed pipe 42 and a return pipe 43. The feed pipe 42 connects the second port 24b of the three-way valve 24 and a water inlet of the indoor heater 90. The return pipe 43 connects a water outlet of the indoor heater 90 with the upstream end of the first common pipe 29.

The controller 50 and the terminal equipment 60 are connected so as to be capable of communicating with each other. A user is capable of inputting a command related to the operation of the hot water supply and indoor-heating system 100, a change in setting values, and like from the terminal equipment 60. The controller 50 includes a storage unit including a ROM (read only memory), a RAM (random access memory), and a nonvolatile memory, a CPU (central processing unit) which executes an arithmetic operation process based on a program stored in the storage unit, and an input/output port which inputs and outputs external signals to and from the CPU. Various actuators and sensors provided in the hot water supply and indoor-heating system 100 including the heat pump system 1 are electrically connected to the controller 50. The controller 50 controls operations of the hot water supply and indoor-heating system 100 including the heat pump system 1 based on detected value of the sensors, signals from the terminal equipment 60, and the like. The terminal equipment 60 is mounted with a display unit which displays information such as a state of the hot water supply and indoor-heating system 100, an operating unit such as switches to be operated by the user, a speaker, a microphone, and the like.

A plurality of temperature sensors (not shown) may be attached at vertical intervals on a surface of the heat storage tank 22. By detecting a temperature distribution inside the heat storage tank 22 in the vertical direction using the temperature sensors, the controller 50 can calculate an amount of stored hot water, an amount of stored heat, an amount of remaining hot water, and the like inside the heat storage tank 22. A temperature sensor (not shown) which detects a temperature of water flowing out from the heating medium outlet 11 of the heat pump system 1 (hereinafter, referred to as a "heat pump outlet temperature") may be attached to the second common pipe 40. A temperature sensor (not shown) which detects a temperature of water flowing into the heating medium inlet 10 of the heat pump system 1 (hereinafter, referred to as a "heat pump inlet temperature") may be attached to the first common pipe 29.

Next, the heat accumulating operation by the hot water supply and indoor-heating system 100 will be described. In the heat accumulating operation, the three-way valve 24 is controlled to a state where the third port 24c is communicated with the first port 24a while blocking the second port 24b and the heat pump system 1 and the circulation pump 23 are operated. In the heat accumulating operation, low temperature water in a lower part of the heat storage tank 22 passes through the first water outlet 26, the lower pipe 28, and the first common pipe 29 and is sent to the heat pump unit 2. In addition, high temperature water having been heated by the heat pump system 1 of the heat pump unit 2 passes through the second common pipe 40, the third port 24c and the first port 24a of the three-way valve 24, the upper pipe 41, and the first water inlet 27 and flows into an upper part of the heat storage tank 22. In the heat accumulating operation, as water circulates as described above, high temperature water is accumulated from above downward inside the heat storage tank 22 and an amount of heat stored in the heat storage tank 22 increases. A circulation circuit of water during the heat accumulating operation described above will be referred to as a "heat accumulating circuit".

The controller 50 may automatically start the heat accumulating operation when a remaining amount of hot water or an amount of stored heat in the heat storage tank 22 drops to or below a low level set in advance. The controller 50 may automatically end the heat accumulating operation when, due to the heat accumulating operation, an amount of stored hot water and an amount of stored heat in the heat storage tank 22 increases and reaches a high level set in advance.

Next, the indoor-heating operation by the hot water supply and indoor-heating system 100 will be described. In the indoor-heating operation, the three-way valve 24 is controlled to a state where the third port 24c is communicated with the second port 24b while blocking the first port 24a and the heat pump system 1 and the circulation pump 23 are operated. In the indoor-heating operation, water having been heated by the heat pump system 1 of the heat pump unit 2 passes through the second common pipe 40, the third port 24c and the second port 24b of the three-way valve 24, and the feed pipe 42 and is sent to the indoor heater 90. The temperature of this water drops as heat is taken away by indoor air, the floor, or the like when the water passes through the indoor heater 90. The temperature-dropped water passes through the return pipe 43 and the first common pipe 29 and returns to the heat pump unit 2. The water having returned to the heat pump unit 2 is re-heated and re-circulated. A circulation circuit of water during the indoor-heating operation described above will be referred to as a "indoor-heating circuit". In the present first embodiment, it is possible to switch between the heat accumulating circuit and the indoor-heating circuit by using the three-way valve 24.

An indoor remote controller (not shown with a built-in room temperature sensor may be arranged in a room in which the indoor heater 90 is installed. The indoor remote controller and the controller 50 may be configured so as to be capable of communicating with each other in a wireless manner. The indoor remote controller may transmit information on a room temperature detected by the room temperature sensor to the controller 50. When performing the indoor-heating operation, the controller 50 may end the indoor-heating operation when the room temperature transmitted from the room temperature sensor reaches a target temperature set in advance. In addition, the user may instruct the controller 50 to start and end the indoor-heating operation by operating the indoor remote controller.

During the heat accumulating operation and the indoor-heating operation, the controller 50 desirably controls the heat pump outlet temperature so as to match a target value. The controller 50 can control the heat pump outlet temperature by adjusting output of the circulation pump 23. When the heat pump outlet temperature is higher than the target value, the controller 50 can control the heat pump outlet temperature so as to match the target value by increasing the output of the circulation pump 23 to increase a circulation flow rate of water. When the heat pump outlet temperature is lower than the target value, the controller 50 can control the heat pump outlet temperature so as to match the target value by reducing the output of the circulation pump 23 to reduce the circulation flow rate of water. The controller 50 may control the heat pump outlet temperature by adjusting an operation of the refrigerant circuit of the heat pump system 1.

During the heat accumulating operation, the controller 50 sets the target value of the heat pump outlet temperature to a first target temperature. During the indoor-heating operation, the controller 50 sets the target value of the heat pump outlet temperature to a second target temperature that is lower than the first target temperature. Desirably, the first target temperature is a temperature within a range of, for example, 65° C. to 90° C. Desirably, the second target temperature is a temperature within a range of, for example, 30° C. to 50° C. By setting the first target temperature higher than the second target temperature, an amount of heat that can be stored in the heat storage tank 22 can be increased. By setting the second target temperature lower than the first target temperature, operation efficiency of the heat pump system 1 during the indoor-heating operation can be improved.

(First Mode and Heat Accumulating Operation)

During the heat accumulating operation, the heat pump system 1 sets the flow of the heating medium to the first mode. Hereinafter, the first mode and the heat accumulating operation will be described. FIG. 3 is a diagram showing a state of the first mode of the heat pump system 1. As shown in FIG. 3, the four-way valve 12 is controlled to the first state in which the first port 12a and the second port 12b are communicated with each other and the third port 12c and the fourth port 12d are communicated with each other. Water flowing in from the heating medium inlet 10 passes the fifth passage 20, the heating medium passage 5b of the second heat exchanger 5, the sixth passage 21, the heating medium passage 4b of the first heat exchanger 4, the second passage 15, the four-way valve 12, and the first passage 14 in this order and flows out from the heating medium outlet 11. Such a flow of the heating medium corresponds to the first mode. Hot water heated using the first mode is accumulated in the heat storage tank 22. The third passage 16 and the fourth passage 18 are communicated with each other via the four-way valve 12. Due to pressure loss of water passing through the second heat exchanger 5, pressure in the fourth passage 18 is lower than pressure in the third passage 16. This fact, in combination with the presence of the cheek valve 13 in the fourth passage 18, prevents water from flowing through the third passage 16 and the fourth passage 18.

Figure 4:
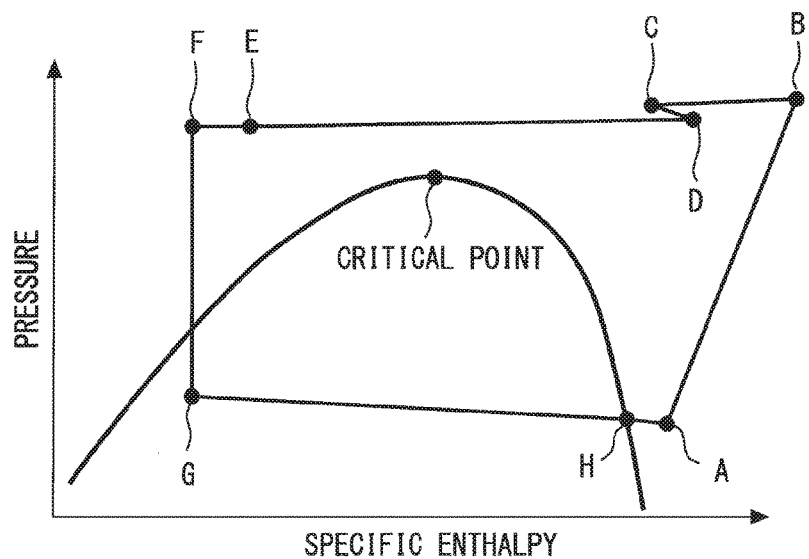
FIG. 4 is a P-h line diagram or, in other words, a Mollier diagram of a refrigerant circuit of the heat pump system in the first mode (a heat accumulating operation).

FIG. 4 is a P-h line diagram or, in other words, a Mollier diagram of the refrigerant circuit of the heat pump system 1 in the first mode (the heat accumulating operation). A curve shown in FIG. 4 represents a saturated vapor line and a saturated liquid line of carbon dioxide that is the refrigerant, A to H in FIG. 4 correspond to pressure and specific enthalpy of the refrigerant at positions A to H in FIG. 3. In the compressing unit 32 of the compressor 3, the refrigerant is compressed to a supercritical state (A→B). This high pressure refrigerant is discharged to the first pipe 35 and, after being cooled by the first heat exchanger 4, returns to the inside of the sealed container 31 (C). The high pressure refrigerant is heated by cooling the electric motor 33 inside the sealed container 31 and then discharged from the third pipe 37 (D). The high pressure refrigerant is cooled by the second heat exchanger 5 (E). Subsequently, the high pressure refrigerant is further cooled by the high/low pressure heat exchanger 9 (F). The high pressure refrigerant is decompressed by the expansion valve 6 and becomes a low pressure refrigerant (G). This low pressure refrigerant is evaporated by the evaporator 7 (H). Subsequently, the low pressure refrigerant is heated by the high/low pressure heat exchanger 9 (A).

Figure 5:
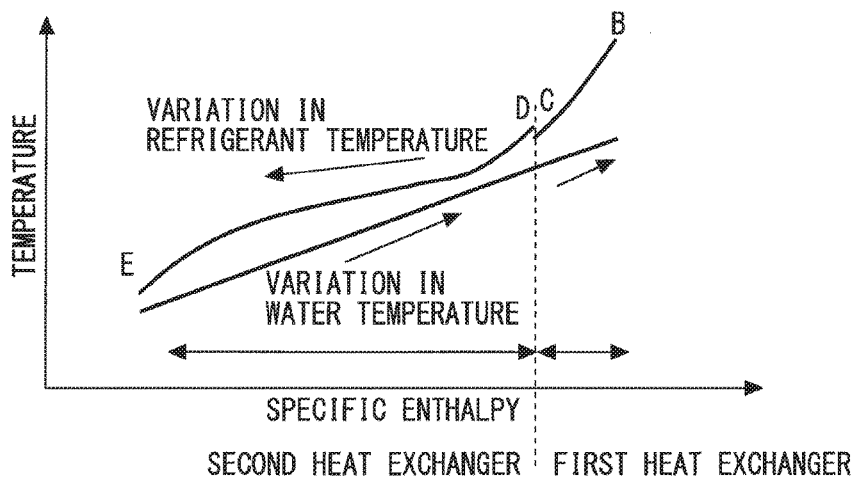
FIG. 5 is a graph showing a variation in temperatures of a refrigerant and water in the heat pump system in the first mode (the heat accumulating operation).

FIG. 5 is a graph showing a variation in temperatures of a refrigerant and water in the heat pump system 1 in the first mode (the heat accumulating operation). A horizontal axis in FIG. 5 represents specific enthalpy of the refrigerant. B to E in FIG. 5 correspond to a temperature and specific enthalpy of the refrigerant at positions B to E in FIG. 3. Water flows through the second heat exchanger 5 and the first heat exchanger 4 in series. Therefore, water temperature is highest at a position where the water exits the first heat exchanger 4. In the first mode, the flows of the refrigerant and water are countercurrent flows in both the second heat exchanger 5 and the first heat exchanger 4.

By using the first mode when performing the heat accumulating operation, since water having reached a moderate temperature in the second heat exchanger 5 further reaches a high temperature in the first heat exchanger 4, the heat pump outlet temperature can be raised in an efficient manner. Therefore, the amount of stored heat of the heat storage tank 22 can be increased efficiently. In the heat accumulating operation, since a difference between the heat pump outlet temperature and the heat pump inlet temperature must be increased, a flow rate of water must be set low. By using the first mode when performing the heat accumulating operation, a decline in the flow velocity of water in the first heat exchanger 4 and the second heat exchanger 5 can be prevented. As a result, a decline in a heat-transfer coefficient of water in the first heat exchanger 4 and the second heat exchanger 5 can be prevented. In the first mode, since flows of the refrigerant and water in both the first heat exchanger 4 and the second heat exchanger 5 are countercurrent flows, heat exchange between the refrigerant and water can be efficiently performed even when there is a large difference between the heat pump outlet temperature and the heat pump inlet temperature. Therefore, the heat pump outlet temperature can be raised even more efficiently.

The pressure and the temperature of the refrigerant are highest in the first pipe 35 (B). The temperature of the refrigerant (D) in the second pipe 36 is lower than the temperature of the refrigerant (B) in the first pipe 35. In such a refrigerant circuit configuration, by arranging the heating medium passage 5b of the second heat exchanger 5 and the heating medium passage 4b of the first heat exchanger 4 in series and making the flows of the refrigerant and water in both the first heat exchanger 4 and the second heat exchanger 5 countercurrent flows, the heat pump outlet temperature can be raised efficiently due to the relationship of temperature variations between the refrigerant and water. In addition, by causing the refrigerant to flow in an order of the compressing unit 32, the first heat exchanger 4, the electric motor 33, and the second heat exchanger 5, the electric motor 33 can be cooled. As a result, since efficiency of the electric motor 33 can be increased, the heat pump outlet temperature can be raised even more efficiently.

(Second Mode and Indoor-Heating Operation)

Figure 6:
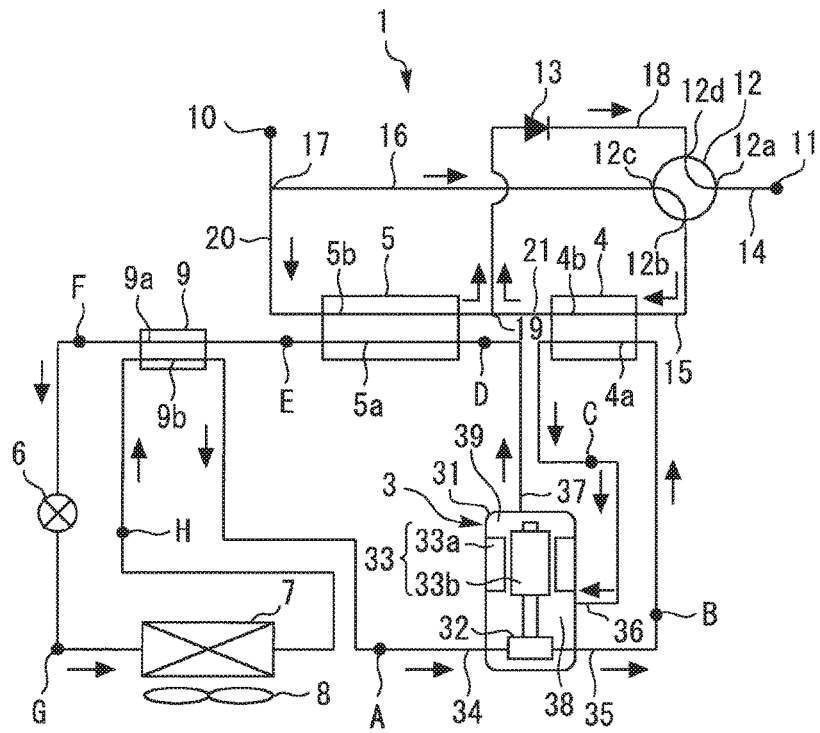
FIG. 6 is a diagram showing a state of a second mode of the heat pump system according to the first embodiment of the present invention.

During the indoor-heating operation, the heat pump system 1 sets a flow of the heating medium to the second mode. Hereinafter, the second mode and the indoor-heating operation will be described. FIG. 6 is a diagram showing a state of the second mode of the heat pump system 1. As shown in FIG. 6, the four-way valve 12 is controlled to the second state in which the first port 12a and the fourth port 12d are communicated with each other and the second port 12b and the third port 12c are communicated with each other. Water having flowed in from the heating medium inlet 10 branches at the branching section 17 into a flow toward the third passage 16 and a flow proceeding as-is through the fifth passage 20. Water in the third passage 16 passes through the four-way valve 12 and the second passage 15 and flows into the heating medium passage 4b of the first heat exchanger 4. Water in the fifth passage 20 flows into the heating medium passage 5b of the second heat exchanger 5. Water having passed through the heating medium passage 4b of the first heat exchanger 4 merges with water having passed through the heating medium passage 5b of the second heat exchanger 5 at the merging section 19 of the sixth passage 21. The merged water passes through the fourth passage 18, the check valve 13, the four-way valve 12, and the first passage 14 and flows out from the heating medium outlet 11. Such a flow of the heating medium corresponds to the second mode. Warm water heated using the second mode flows into the indoor heater 90. In this manner, in the second mode, water flows through the first heat exchanger 4 and the second heat exchanger 5 in parallel.

Figure 7:
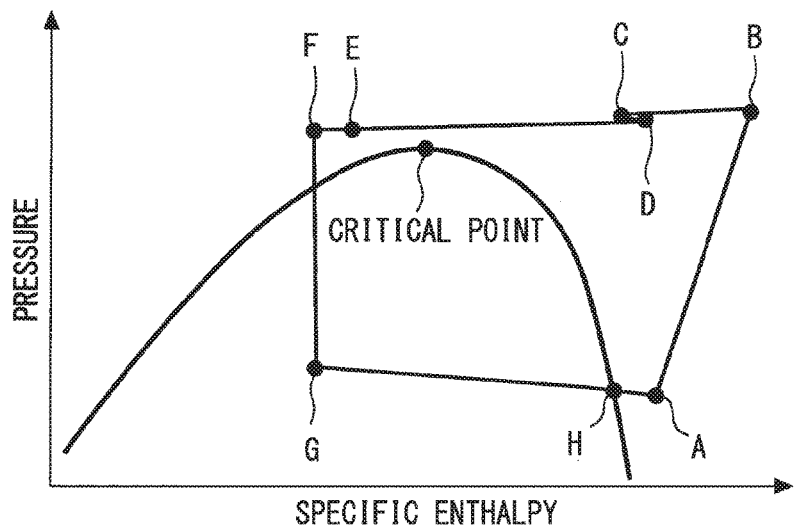
FIG. 7 is a P-h line diagram or, in other words, a Mollier diagram of the refrigerant circuit of the heat pump system in the second mode (an indoor-heating operation).

FIG. 7 is a P-h line diagram or, in other words, a Mollier diagram of the refrigerant circuit of the heat pump system 1 in the second mode (the indoor-heating operation). A curve shown in FIG. 7 represents a saturated vapor line and a saturated liquid line of carbon dioxide that is the refrigerant. A to H in FIG. 7 correspond to pressure and specific enthalpy of the refrigerant at positions A to H in FIG. 6. While basically the same as the operation of the refrigerant circuit in the first mode, the operation of the refrigerant circuit in the second mode differs in the following points. Compressing unit discharge pressure in the second mode is lower than compressing unit discharge pressure in the first mode. Specific enthalpy of the refrigerant (E) exiting the second heat exchanger 5 in the second mode is higher as compared to the first mode.

Figure 8:
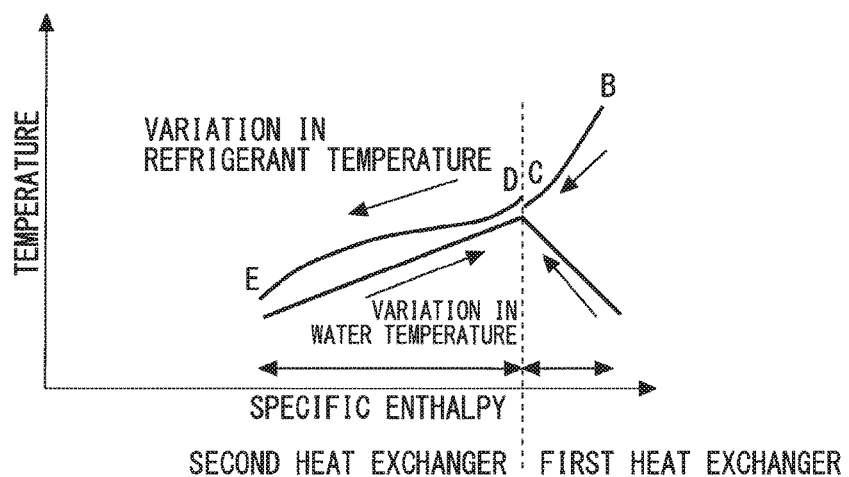
FIG. 8 is a graph showing a variation in temperatures of the refrigerant and water in the heat pump system in the second mode (the indoor-heating operation).

FIG. 8 is a graph showing a variation in temperatures of the refrigerant and water in the heat pump system 1 in the second mode (the indoor-heating operation). A horizontal axis in FIG. 8 represents specific enthalpy of the refrigerant. B to E in FIG. 8 correspond to a temperature and specific enthalpy of the refrigerant at positions B to E in FIG. 6. Water flows through the first heat exchanger 4 and the second heat exchanger 5 in parallel. Flows of the refrigerant and water in the second heat exchanger 5 are countercurrent flows. A temperature of water exiting the second heat exchanger 5 is higher than a temperature of the refrigerant (E) exiting the second heat exchanger 5. Flows of the refrigerant and water in the first heat exchanger 4 are concurrent flows. A temperature of water exiting the first heat exchanger 4 is lower than a temperature of the refrigerant (C) exiting the first heat exchanger 4.

In the indoor-heating operation, since a difference between the heat pump outlet temperature and the heat pump inlet temperature is small, the flow rate of water must be increased. By using the second mode when performing the indoor-heating operation, an increase in pressure loss of water in the first heat exchanger 4 and the second heat exchanger 5 can be prevented and the water flow rate can be sufficiently increased. In order to increase the heat-transfer coefficient of water in the heat accumulating operation, the heating medium passage 4b of the first heat exchanger 4 and the heating medium passage 5b of the second heat exchanger 5 may be designed so as to have small flow path cross-sectional areas. Even in such cases, an increase in pressure loss during the indoor-heating operation can be prevented and the water flow rate can be sufficiently increased. In addition, an increase in the flow velocity of water in the first heat exchanger 4 and the second heat exchanger 5 can be prevented. As a result, erosion of the heating medium passage 4b and the heating medium passage 5b can be prevented. Furthermore, since the refrigerant flows through the first heat exchanger 4 and the second heat exchanger 5 in series, a refrigerant flow velocity does not decrease and a decline in the heat-transfer coefficient of the refrigerant can be prevented.

In the present first embodiment, since flows of the refrigerant and water in the first heat exchanger 4 in the second mode are concurrent flows, an amount of cooling of the refrigerant in the first heat exchanger 4 can be prevented from increasing excessively. As a result, the following advantage is gained. Refrigerator oil is discharged together with the refrigerant from the compressing unit 32 of the compressor 3. The refrigerator oil flows through the heating medium passage 4b of the first heat exchanger 4 and the second pipe 36 together with the refrigerant. The refrigerant and the refrigerator oil flow into the sealed container 31 from the second pipe 36 and are separated from each other. When the refrigerant is excessively cooled by the first heat exchanger 4, the temperature of the refrigerant flowing into the internal space 38 of the compressor 3 drops and density thereof increases. As a result, a difference between density of the refrigerant and density of the refrigerator oil decreases and efficiency of separation of the refrigerant and the refrigerator oil declines. In the second mode, since water not heated by the second heat exchanger 5 enters the first heat exchanger 4, the temperature of water entering the first heat exchanger 4 is lower than in the first mode. Therefore, in the second mode, the temperature of the refrigerant exiting the first heat exchanger 4 drops more readily. By making the flows of the refrigerant and water in the first heat exchanger 4 in the second mode concurrent flows, the temperature of the refrigerant (C) exiting the first heat exchanger 4 can be prevented from dropping excessively and a decline in the separation efficiency of the refrigerant and the refrigerator oil can be prevented. As a result, an increase in an oil circulation rate of a refrigerating cycle can be prevented and reliability of the refrigerating cycle can be increased.

In the first heat exchanger 4, a temperature difference between the refrigerant and water increases as compared to the second heat exchanger 5. Making the refrigerant and water in the first heat exchanger 4 countercurrent flows increases an amount of heat exchange, raises the temperature of water exiting the first heat exchanger 4, and lowers the temperature of the refrigerant exiting the first heat exchanger 4. Since the refrigerant cooled by the first heat exchanger 4 flows into the second heat exchanger 5, when the temperature of the refrigerant exiting the first heat exchanger 4 drops, the temperature of water exiting the second heat exchanger 5 drops. Due to the factors described above, making the flows of the refrigerant and water in the first heat exchanger 4 in the second mode countercurrent flows causes water with a relatively high temperature exiting the first heat exchanger 4 and water with a relatively low temperature exiting the second heat exchanger 5 to merge and creates mixing loss. In contrast, by making the flows of the refrigerant and water in the first heat exchanger 4 in the second mode concurrent flows, the temperature of water exiting the first heat exchanger 4 and the temperature of water exiting the second heat exchanger 5 are brought close to each other and mixing loss can be prevented.

In the present first embodiment, the refrigerant and water in the second heat exchanger 5 are countercurrent flows in both the first mode and the second mode. The lower the temperature of the refrigerant exiting the second heat exchanger 5, the larger a variation in overall enthalpy including the first heat exchanger 4 and the second heat exchanger 5 and the higher a COP (Coefficient Of Performance). By configuring the second heat exchanger 5 to always have a countercurrent flow, the temperature of the refrigerant exiting the second heat exchanger 5 can be lowered and the COP can be increased. In the second heat exchanger 5, a temperature difference between the refrigerant and water is smaller as compared to the first heat exchanger 4. In consideration thereof, desirably, an amount of heat exchange by the second heat exchanger 5 is improved by making a heat transfer area of the second heat exchanger 5 larger than a heat transfer area of the first heat exchanger 4.

Figure 9:
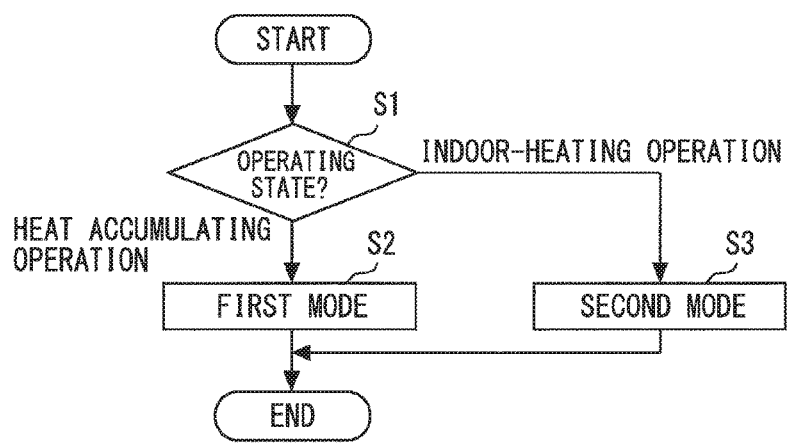
FIG. 9 is a flow chart showing a control operation of a controller according to the first embodiment.

FIG. 9 is a flow chart showing a control operation of the controller 50 according to the present first embodiment. First, the controller 50 determines whether an operating state of the hot water supply and indoor-heating system 100 is the heat accumulating operation or the indoor-heating operation (step S1). When the operating state of the hot water supply and indoor-heating system 100 is the heat accumulating operation, the controller 50 makes a transition to step S2. In step S2, the controller 50 selects the first mode and sets a flow of the heating medium to the first mode. In contrast, when the operating state of the hot water supply and indoor-heating system 100 is the indoor-heating operation, the controller 50 makes a transition to step S3. In step S3, the controller 50 selects the second mode and sets a flow of the heating medium to the second mode.

According to the flow chart described above, by providing the controller 50 which controls switching between the first mode and the second mode in accordance with an operating state, the first mode and the second mode can be automatically switched in accordance with an operating state and suitable operations can be performed in a reliable manner.

In the present first embodiment, the switching apparatus which switches between the first mode and the second mode is configured using one four-way valve 12 and one check valve 13. The check valve 13 is automatically switched between open and close states due to flow and a pressure difference. Therefore, the single four-way valve 12 is the only actuator that needs to be operated in the switching apparatus. Therefore, switching between the first mode and the second mode can be readily performed.

Second Embodiment

Figure 10:
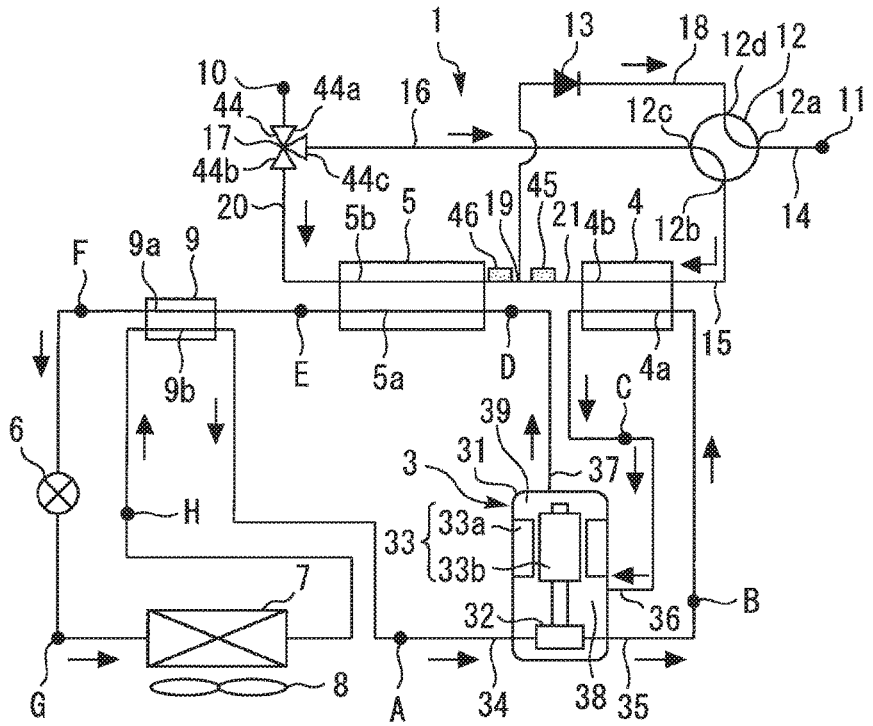
FIG. 10 is a configuration diagram showing a heat pump system according to a second embodiment of the present invention.

Next, while a second embodiment of the present invention can be described with reference to FIG. 10, the description will focus on differences from the first embodiment described above and portions that are the same as or equivalent to portions of the first embodiment will be denoted by the same reference signs and a description thereof will be omitted. FIG. 10 is a configuration diagram showing a heat pump system 1 according to the second embodiment of the present invention. The heat pump system 1 according to the present second embodiment shown in FIG. 10 includes, in addition to the configuration of the first embodiment, a three-way valve 44, a temperature sensor 45, and a temperature sensor 46.

The three-way valve 44 includes an inlet 44a, a first outlet 44b, and a second outlet 44c. The inlet 44a communicates with the heating medium inlet 10. The first outlet 44b communicates with the heating medium passage 5b of the second heat exchanger 5 via the fifth passage 20. The second outlet 44c communicates with the third passage 16. The three-way valve 44 is capable of changing a ratio between a flow path cross-sectional area of the first outlet 44b and a flow path cross-sectional area of the second outlet 44c. By changing the ratio between the flow path cross-sectional area of the first outlet 44b and the flow path cross-sectional area of the second outlet 44c in the second mode, a ratio between the flow rate or water in the first heat exchanger 4 and the flow rate of water in the second heat exchanger 5 can be changed. In the present second embodiment, the three-way valve 44 corresponds to an adjuster which adjusts the ratio between the flow rate of water in the first heat exchanger 4 and the flow rate of water in the second heat exchanger 5 in the second mode.

The temperature sensor 45 detects a temperature of water exiting the first heat exchanger 4 in the second mode. The temperature sensor 46 detects a temperature of water exiting the second heat exchanger 5 in the second mode. In the second mode (the indoor-heating operation), the controller

50 desirably adjusts the ratio between the flow path cross-sectional area of the first outlet 44b and the flow path cross-sectional area of the second outlet 44c of the three-way valve 44 so that a temperature detected by the temperature sensor 45 and a temperature detected by the temperature sensor 46 are equal to or close to each other. According to the present second embodiment, even when the pressure and the temperature of the refrigerant vary due to a change in operating conditions such as outside air temperature and the heat pump inlet temperature, a state where the temperature of water exiting the first heat exchanger 4 and the temperature of water exiting the second heat exchanger 5 are equal to or close to each other can be maintained. As a result, loss due to mixing of water with different temperatures can be more reliably prevented and operations can be performed with greater efficiency.

Third Embodiment

Figure 11:
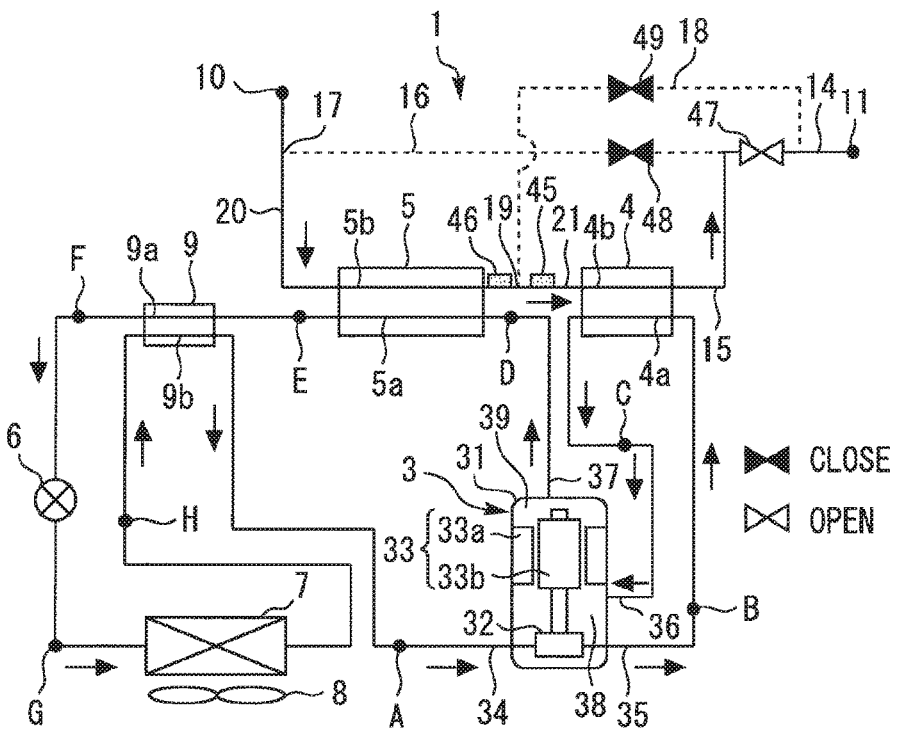
FIG. 11 is a diagram showing a state of a first mode of a heat pump system according to a third embodiment of the present invention.
Figure 12:
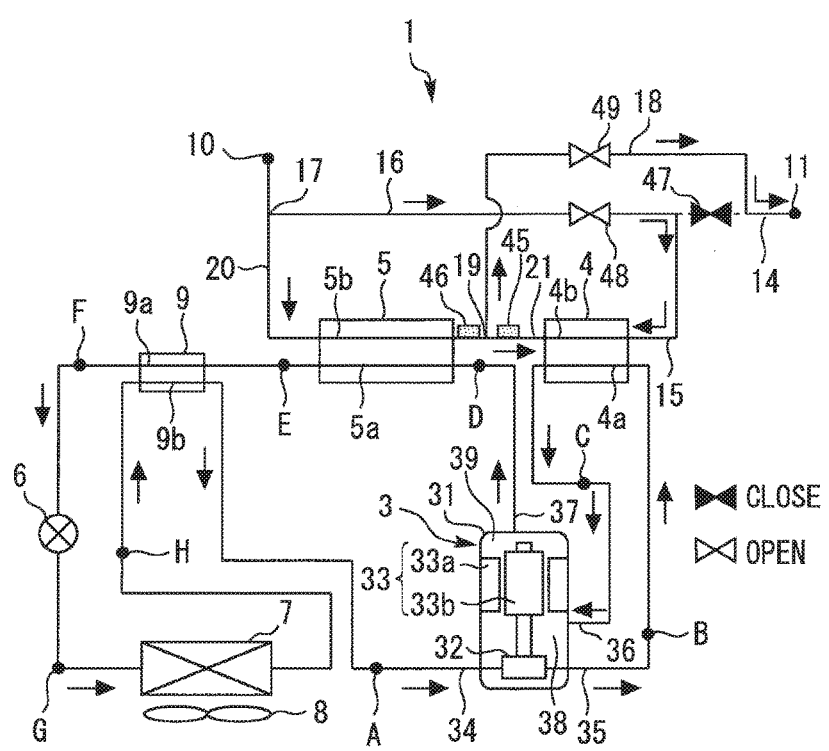
FIG. 12 is a diagram showing a state of a second mode of the heat pump system according to the third embodiment of the present invention.

Next, while a third embodiment of the present invention will be described with reference to FIGS. 11 and 12, the description will focus on differences from the first and second embodiments described above, and same or equivalent portions will be denoted by the same reference signs and descriptions thereof will be omitted. FIG. 11 is a diagram showing a state of a first mode of a heat pump system 1 according to the third embodiment of the present invention. FIG. 12 is a diagram showing a state of a second mode of the heat pump system 1 according to the third embodiment of the present invention. The heat pump system 1 according to the present third embodiment shown in these diagrams includes three two-way valves 47, 48, and 49 in place of the four-way valve 12 and the check valve 13 according to the first embodiment.

The first passage 14 connects one of the ports of the two-way valve 47 with the heating medium outlet 11. One end of the second passage 15 is connected to the heating medium passage 4b of the first heat exchanger 4. One end of the third passage 16 is connected to the branching section 17. The other end of the second passage 15 and the other end of the third passage 16 are joined and connected to the other port of the two-way valve 47. The two-way, valve 48 is connected to the middle of the third passage 16. The fourth passage 18 connects the merging section 19 to the middle of the first passage 14. The two-way valve 49 is connected to the middle of the fourth passage 18.

As shown in FIG. 11, the first mode is set by opening the two-way valve 47 and closing the two-way valve 48 and the two-way valve 49. As shown in FIG. 12, the second mode is set by closing the two-way valve 47 and opening the two-way valve 48 and the two-way valve 49. In the present third embodiment, the two-way valve 47, the two-way valve 48, the two-way valve 49, the first passage 14, the second passage 15, the third passage 16, the branching section 17, the fourth passage 18, the merging section 19, the fifth passage 20, and the sixth passage 21 correspond to a switching apparatus which switches the flow of the heating medium between the first mode and the second mode. According to the present third embodiment, since the first mode and the second mode can be switched with the switching apparatus using the plurality of two-way valves with simple structures, a reduction in cost can be achieved.

Favorably, the opening of the two-way valve 48 is variable. In the second mode, by changing the opening of the two-way valve 48, a ratio between the flow rate of water in the first heat exchanger 4 and the flow rate of water in the second heat exchanger 5 can be changed. Increasing the opening of the two-way valve 48 causes the flow rate of water in the first heat exchanger 4 to increase and reducing the opening of the two-way valve 48 causes the flow rate of water in the first heat exchanger 4 to decrease. In this case, the two-way valve 48 corresponds to an adjuster which adjusts the ratio between the flow rate of water in the first heat exchanger 4 and the flow rate of water in the second heat exchanger 5 in the second mode. In the second mode (the indoor-heating operation), the controller 50 desirably adjusts the opening of the two-way valve 48 so that the temperature detected by the temperature sensor 45 and the temperature detected by the temperature sensor 46 are equal to or close to each other. As a result, a similar effect to the second embodiment is produced.

While embodiments of the present invention have been described above, it is to be understood that the present invention is not limited to the embodiments. The refrigerant according to the present invention is not limited to carbon dioxide. In the present invention, a refrigerant of which pressure when inside the first heat exchanger and the second heat exchanger is lower than critical pressure may be used. In addition, the present invention can also be applied to a heat pump system using a compressor configured to further compress a refrigerant sucked in through the second pipe and to discharge the compressed refrigerant to the third pipe.

REFERENCE SIGNS LIST

1 heat pump system
2 heat pump unit
3 compressor
4 first heat exchanger
4a refrigerant passage
4b heating medium passage
5 second heat exchanger
5a refrigerant passage
5b heating medium passage
6 expansion valve
7 expansion valve
8 air blower
9 high/low pressure heat exchanger
9a high pressure passage
9b low pressure passage
10 heating medium inlet
11 heating medium outlet
12 four-way valve
12a first port
12b second port
12c third port
12d fourth port
13 check valve
14 first passage
15 second passage
16 third passage
17 branching section
18 fourth passage
19 merging section
20 fifth passage
21 sixth passage
22 heat storage tank
23 circulation pump
24 three-way valve
24a first port
24b second port
24c third port
25 hot water supply pipe
26 first water outlet 27 first water inlet
28 lower pipe
29 first common pipe
30 water supply pipe
31 sealed container
32 compressing unit
33 electric motor
33a stator
33b rotor
34 fourth pipe
35 first pipe
36 second pipe
37 third pipe
38, 39 internal space
40 second common pipe
41 upper pipe
42 feed pipe
43 return pipe
44 three-way valve
44a inlet
44b first outlet
44c second outlet
45,46 temperature sensor
47,48,49 two-way valve
50 controller
60 terminal equipment
90 indoor heater
100 hot water supply and indoor-heating system

The invention claimed is:

1. A heat pump system comprising:
a compressor configured to compress refrigerant;
a first heat exchanger configured to exchange heat between the refrigerant compressed by the compressor and a heating medium;
a second heat exchanger configured to exchange heat between the refrigerant compressed by the compressor and the heating medium;
a first pipe through which the refrigerant is fed from the compressor to the first heat exchanger;
a second pipe through which the refrigerant returns from the first heat exchanger to the compressor;
a third pipe through which the refrigerant is fed from the compressor to the second heat exchanger after returning from the first heat exchanger; and
a switching apparatus configured to switch a flow of the heating medium between a first mode and a second mode, the heating medium flowing through the first heat exchanger and the second heat exchanger in series in the first mode, the heating medium flowing through the first heat exchanger and the second heat exchanger in parallel in the second mode,
wherein in the second mode, flows of the refrigerant and the heating medium in the first heat exchanger become concurrent flows and flows of the refrigerant and the heating medium in the second heat exchanger become countercurrent flows.

2. The heat pump system according to claim 1, wherein the compressor includes a compressing unit in which the refrigerant is compressed, an electric motor configured to drive the compressing unit, and a sealed container configured to house the compressing unit and the electric motor,
the refrigerant compressed by the compressing unit is fed to the first heat exchanger through the first pipe without being discharged to an internal space of the sealed container,
the refrigerant having passed through the second pipe is discharged to the internal space of the sealed container, and
the refrigerant in the internal space of the sealed container is fed to the second heat exchanger through the third pipe.

3. The heat pump system according to claim 1, wherein in the first mode, flows of the refrigerant and the heating medium in the first heat exchanger and the second heat exchanger become countercurrent flows.

4. The heat pump system according to claim 1, further comprising an adjuster configured to adjust a ratio between a flow rate of the heating medium in the first heat exchanger and a flow rate of the heating medium in the second heat exchanger in the second mode.

5. The heat pump system according to claim 1, wherein the switching apparatus includes a four-way valve having a first port, a second port, a third port, and a fourth port and a check valve configured to prevent a backflow, and
the four-way valve is configured to switch between a first state in which the first port and the second port are communicated with each other and the third port and the fourth port are communicated with each other and a second state in which the first port and the fourth port are communicated with each other and the second port and the third port are communicated with each other.

6. The heat pump system according to claim 5, wherein the switching apparatus further includes
a first passage connecting a heating medium outlet of the heat pump system with the first port,
a second passage connecting a heating medium passage of the first heat exchanger with the second port,
a third passage connecting a branching section, where the heating medium prior to being heated branches in the second mode, with the third port, and
a fourth passage connecting a merging section, where the heating medium heated by the first heat exchanger and the heating medium heated by the second heat exchanger merge in the second mode, with the fourth port, and
the check valve is configured to prevent a backflow in the fourth passage.

7. The heat pump system according to claim 1, wherein the switching apparatus includes a plurality of two-way valves configured to open and close flow paths.

8. The heat pump system according to claim 1, further comprising a controller configured to control switching between the first mode and the second mode.

9. The heat pump system according to claim 8, wherein the controller is configured to select the first mode when performing a heat accumulating operation for accumulating heat in a heat storage tank and select the second mode when performing an indoor-heating operation for feeding the heating medium to an indoor heater.

10. A heat pump system comprising:
a compressor configured to compress refrigerant;
a first heat exchanger configured to exchange heat between the refrigerant compressed by the compressor and a heating medium;
a second heat exchanger configured to exchange heat between the refrigerant compressed by the compressor and the heating medium;
a first pipe through which the refrigerant is fed from the compressor to the first heat exchanger;
a second pipe through which the refrigerant returns from the first heat exchanger to the compressor;

a third pipe through which the refrigerant is fed from the compressor to the second heat exchanger after returning from the first heat exchanger; and a switching apparatus configured to switch a flow of the heating medium between a first mode and a second mode, the heating medium flowing through the first heat exchanger and the second heat exchanger in series in the first mode, the heating medium flowing through the first heat exchanger and the second heat exchanger in parallel in the second mode, wherein the switching apparatus includes a four-way valve having a first port, a second port, a third port, and a fourth port and a check valve configured to prevent a backflow, and the four-way valve is configured to switch between a first state in which the first port and the second port are communicated with each other and the third port and the fourth port are communicated with each other and a second state in which the first port and the fourth port are communicated with each other and the second port and the third port are communicated with each other.

11. The heat pump system according to claim 10, wherein the compressor includes a compressing unit in which the refrigerant is compressed, an electric motor configured to drive the compressing unit, and a sealed container configured to house the compressing unit and the electric motor, the refrigerant compressed by the compressing unit is fed to the first heat exchanger through the first pipe without being discharged to an internal space of the sealed container, the refrigerant having passed through the second pipe is discharged to the internal space of the sealed container, and the refrigerant in the internal space of the sealed container is fed to the second heat exchanger through the third pipe.

12. The heat pump system according to claim 10, wherein in the second mode, flows of the refrigerant and the heating medium in the first heat exchanger become concurrent flows and flows of the refrigerant and the heating medium in the second heat exchanger become countercurrent flows.

13. The heat pump system according to claim 10, wherein in the first mode, flows of the refrigerant and the heating medium in the first heat exchanger and the second heat exchanger become countercurrent flows.

14. The heat pump system according to claim 10, further comprising an adjuster configured to adjust a ratio between a flow rate of the heating medium in the first heat exchanger and a flow rate of the heating medium in the second heat exchanger in the second mode.

15. The heat pump system according to claim 10, wherein the switching apparatus further includes a first passage connecting a heating medium outlet of the heat pump system with the first port, a second passage connecting a heating medium passage of the first heat exchanger with the second port, a third passage connecting a branching section, where the heating medium prior to being heated branches in the second mode, with the third port, and a fourth passage connecting a merging section, where the heating medium heated by the first heat exchanger and the heating medium heated by the second heat exchanger merge in the second mode, with the fourth port, and the check valve is configured to prevent a backflow in the fourth passage.

16. The heat pump system according to claim 10, further comprising a controller configured to control switching between the first mode and the second mode.

17. The heat pump system according to claim 16, wherein the controller is configured to select the first mode when performing a heat accumulating operation for accumulating heat in a heat storage tank and select the second mode when performing an indoor-heating operation for feeding the heating medium to an indoor heater.

* * * * *